United States Patent [19]
Sällberg et al.

[11] Patent Number: 5,361,252
[45] Date of Patent: Nov. 1, 1994

[54] METHOD AND A DEVICE FOR MONITORING CHANNEL SPLIT DATA PACKET TRANSMISSION

[75] Inventors: Hans K. M. Sällberg, Trollebergsvägen; Leif M. Larsson, Telebruksgatan, both of Sweden

[73] Assignee: Telefonaktiebolaget L M Ericsson, Stockholm, Sweden

[21] Appl. No.: 30,724

[22] Filed: Mar. 12, 1993

[30] Foreign Application Priority Data

Mar. 13, 1992 [SE] Sweden ................................. 9200775

[51] Int. Cl.$^5$ ............................................. H04J 3/14
[52] U.S. Cl. ....................................... 370/17; 370/60; 370/94.1
[58] Field of Search ...................... 370/13, 14, 16, 17, 370/60, 60.1, 94.1

[56] References Cited

U.S. PATENT DOCUMENTS

| | | | |
|---|---|---|---|
| 4,849,968 | 7/1989 | Turner | 370/94.1 |
| 4,896,316 | 1/1990 | Lespagnol et al. | 370/60 |
| 4,993,024 | 2/1991 | Quinquis et al. | 370/94.1 |
| 5,007,048 | 4/1991 | Kowalk | 370/60 |
| 5,014,260 | 5/1991 | Wicklund | 370/13 |
| 5,081,620 | 1/1992 | Girard et al. | 370/60 |
| 5,115,429 | 5/1992 | Hluchyj et al. | 370/94.1 |
| 5,132,961 | 7/1992 | Thiebaut et al. | 370/94.1 |
| 5,216,670 | 6/1993 | Ofek et al. | 370/94.1 |

FOREIGN PATENT DOCUMENTS

| | | |
|---|---|---|
| 0275678 | 7/1988 | European Pat. Off. |
| 0383660 | 8/1990 | European Pat. Off. |
| 0384758 | 8/1990 | European Pat. Off. |
| 90/05416 | 5/1990 | WIPO |

*Primary Examiner*—Alpus H. Hsu
*Attorney, Agent, or Firm*—Burns, Doane, Swecker & Mathis

[57] ABSTRACT

The transfer of data packets are monitored in a line having various logical channels. For each logical channel there is a count value and at the arrival of a data packet, or in each time slot when the transmission on said line is time multiplexed, i.e., for each time when a packet could have arrived in a time multiplexed system, only the count value for a single channel is decremented. Then it is determined whether the received data packet, if there is one, is to be forwarded or is to be discarded by the comparison of a calculated value ($F_n$) to a threshold value ($T_n$) belonging to the channel to which the packet belongs. In the calculation of the value ($F_n$), the number is used of those channels which have not been decremented after decrementing the channel to which the received packet belongs. In this way, the calculated value ($F_n$) can be made to resemble the calculated value or level value, which is used in prior methods for handling loss of packets in a network. For each received packet this method requires only a decrementing of one count value, implying a significant saving of time and a simplification of the circuits used for carrying out the method.

33 Claims, 6 Drawing Sheets

METHOD AND A DEVICE FOR MONITORING CHANNEL SPLIT DATA PACKET TRANSMISSION

BACKGROUND

The present invention is related to a method and a device for monitoring the flow of data packets on a transmission line having several channels and in particular for prohibiting data packets for each channel from being transmitted with an intensity, which is too high and not allowed. In other words, for time divided data packet traffic having several channels on a line the band width for each channel should always be preserved and not be exceeded.

Leaky Bucket (LB) is a prior art method for monitoring the band width for an incoming stream of data packets or cells, which for instance are forwarded in a network of the ATM type (Asynchronous Transfer Mode), and it is described in the U.S. Pat. No. 5,014,260 claiming convention priority from the Swedish patent application SE 8803875-7 with publication number 462360, said U.S. patent being expressly incorporated by reference herein.

Other prior art relevant to the invention appears from the patent documents EP-A1-0 381 275, EP-A1-0 275 678, WO-A1-90/05416, U.S. Pat. Nos. 4,896,316, 4,993,024, EP-A1-0 310 173, EP-A1-0 387 958, EP-A2-0 384 758, EP-A1-0 383 660.

In the prior methods counters are provided for each channel. All these counters are decreased regularly in time with a value, which is predetermined for each channel. When a data packet arrives, the identity or number of the channel is determined, to which the packet belongs, and then the counter value of this channel is checked or inspected. If the counter value is larger than a threshold value, which is predetermined for said channel, the data packet is discarded or lost and is thus not forwarded on the transmission line. Otherwise the counter value for this channel is incremented with a value particular for said channel and the data packet is forwarded on the transmission line.

By means of this prior process one parameter for the channel rate or band width can be monitored, e.g. the peak rate or the mean rate. With a small threshold value the peak rate may be monitored and with a larger threshold value an upper limit of the mean rate may be monitored. By combining two processes of this kind, providing a so called Dual Leaky Bucket, the peak and mean rate for a channel can be monitored. If any one of the respective threshold values is exceeded, the present data packet is discarded or lost.

In this prior method the whole process is performed in real time without any buffering of several data packets taking place. Instead there is only one register or memory unit containing one data packet each time. When the data packet has arrived to this register, it is immediately decided by the comparison described above, if the data packet is to be forwarded. When the number of channels being used on the transmission line is large, there may be difficulties of having time for the various calculations which are required in the above method. Particularly time consuming is the step of decrementing, in certain short time intervals, the count values for the various channels by a decrement value depending on each channel. If the number of channels for instance is so large as several hundreds, it may be impossible to have time for all these calculations. A possibility would then be to provide individual counter circuits for each channel, i.e. one hardware counter for each channel. For cost reasons this solution may be impossible.

SUMMARY

In order to obviate the problem indicated above a method and a device are proposed according to the invention characteristics of which are described herein.

Thus there is, like the prior art, a count value for each channel on the transmission line. On each occasion, when otherwise all these count values should be decremented, only a small portion is decremented, preferably a small number of such count values, e.g. only one value. The decrementing of the count values of the channels is performed in such a way, that said decrementing will pass the channels cyclically. Suitably there is stored in a memory unit, information identifying the channel, for which this value was latest changed.

When a data packet arrives, instead a new value is calculated, the size of which corresponds to the count value which exists in the known method. This calculated value is then compared to a threshold value for the channel, in which the packet is transferred, and if the calculated value is larger than said threshold value, the data packet may be discarded and thus need not be forwarded. Otherwise the packet is always forwarded and then also said count value for the channel thereof is modified. In certain cases a packet may be forwarded, for instance if the transmission activity is small on the line, even if the packet should have been discarded according to the comparison above. In such cases a flag may be set in a signal field of the packet having the meaning that the packet can be lost or discarded. In the following only the case is treated where the packet is discarded directly, but it is understood, that the invention equally well can be used for the case where only some indication is set that the packet is allowed to be discarded or has a lower priority than other packets belonging to the same channel. For instance a loss priority flag may be set or changed in the header of the data packet, said flag indicating that the packet has a low loss priority and can be lost or discarded before other packets having a larger loss priority, when the transmission load is high somewhere in the network.

BRIEF DESCRIPTION OF THE DRAWINGS

The invention will now be described with reference to the accompanying drawings, in which FIG. 1 schematically shows where a device according to the invention may be located, FIG. 2 schematically shows a device for carrying out the invention, FIGS. 3 and 4 schematically show two calculating steps according to the invention.

DETAILED DESCRIPTION

Figure 1:
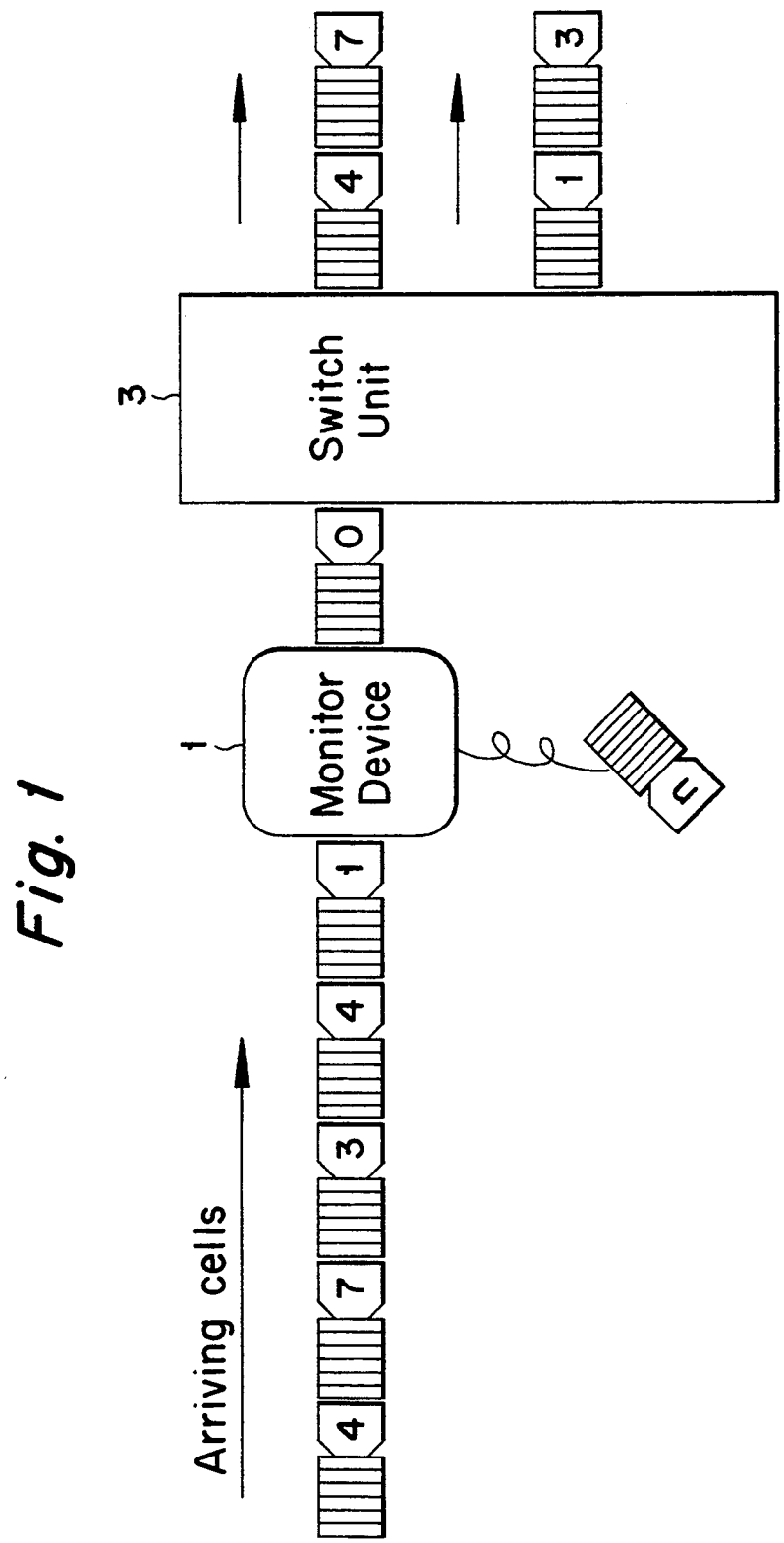

In FIG. 1 is schematically shown how a number of data packets, the channel numbers of which are indicated in the drawing symbols of the data packets, arrive to a device 1 according to the invention. In the device according to the invention certain data packets or cells are discarded (lost) or marked, as is illustrated for the packet having the channel number n in FIG. 1. The mark indicates, that the packet can be discarded. The device according to the invention has the purpose of prohibiting a data network from becoming overloaded, for instance in particular when a switch unit 3 is flooded by arriving cells.

Figure 2:
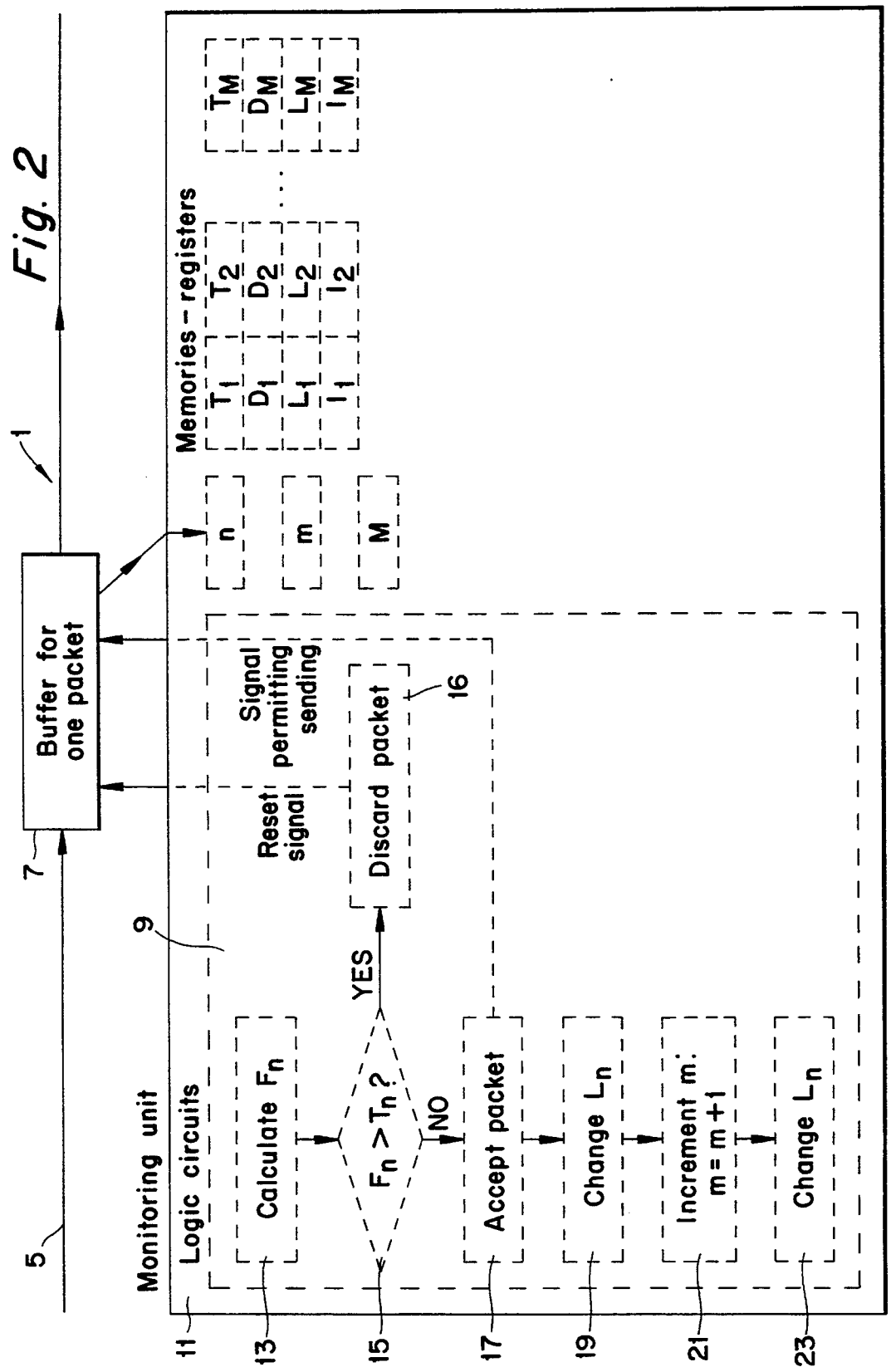

In FIG. 2 is illustrated in more detail how the device according to the invention is constructed and operates. For a transmission line 5 a buffer memory or register 7 is provided, which can contain maximally one data packet or one cell. When a data packet arrives to the buffer 7, information is fetched from said packet comprising the channel number n of the packet. This channel number n is then processed by logical circuits 9 in a monitoring unit 11. When a data packet arrives to the buffer 7, thus a calculation loop is started inside these logical circuits 9.

The monitoring unit 11 also contains several memories or registers for various items used by the logical circuits 9. In these memories or registers thus can be found the stored number n of the channel of the present data packet and a channel number m indicating the number of a channel, the first count value $L_m$ of which was latest changed. Further, information is provided on the total number (M) of channels, which the monitoring unit 11 is capable of treating. For each channel also a threshold value $T_i$ is recorded, a modification value or step value $D_i$, an increment or addition value $I_i$, and the count value or the first value $L_i$. i here means the channel number and runs from 1 up to and including M. The parameters $T_i$, $D_i$, and $I_i$ are individual or particular for each channel in the general case.

When a data packet arrives to the buffer 7, a signal thereof and information on the channel number n of the packet are sent to the logical circuits 9. These circuits then start the following calculation sequence. In the block 13 a value $F_n$ for the channel is calculated. This value depends on the channel number and also on the number of channels, which are left and the values of which are to be changed in steps until the value for exactly this channel shall be changed or decremented. This calculated value $F_n$ is then compared in the block 15 to a threshold value $T_n$ for the channel n and if the threshold value is smaller than this calculated value $F_n$, the packet is discarded and a suitable signal in the block 16 is sent to the buffer 7, this signal having the meaning, that the buffer shall not forward the packet. If the comparison in the block 15 instead receives the answer NO, the packet is accepted and is to be forwarded and in the block 17 a signal thereof is sent to the buffer 7. Then the count value $L_n$ for this channel is changed in the block 19.

The transmission of packets on the line 5 is supposed to be regularly divided in time in such a way, that packets are sent or arrive on fixed, regularly repeated times or in the corresponding periods between said times, that the transmission takes always place in definite time slots. The time period between these repeated times can also be termed a cell time or cell period. With a small load on the network packets do not arrive in each time slot. Further, for each time slot or cell period, in the block 21 the value of a variable m is changed, this variable indicating the number of that channel, for which the count value $L_m$ was latest decremented. The change can be performed for instance by incrementing m by one. When this is performed for this next channel in turn having number m, the first count value $L_m$ belonging thereto is modified in the block 23. When these steps have been performed, the process will await the beginning of the next cell period. For a full load on the line 5 this condition is the same as the arrival of a new data packet to the buffer 7.

Figure 3:
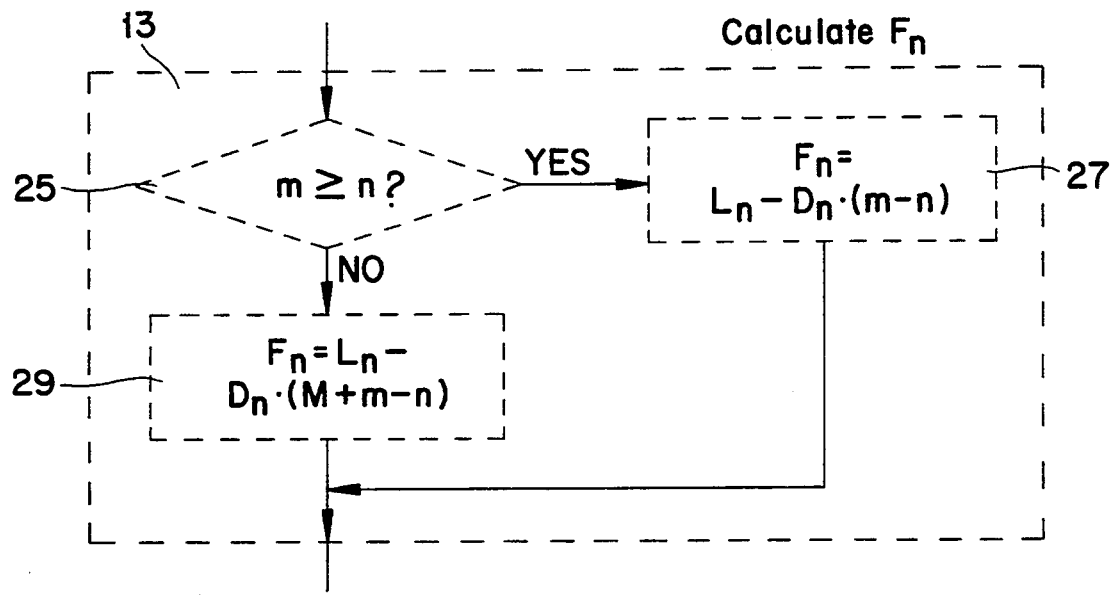

In FIG. 3 is illustrated in detail the calculation of $F_n$ in the block 13. In a block 25 the present number m, which indicates the number of the channel, the count value $L_m$ of which was latest changed, is thus compared to the channel number n of the received data packet and if this latter value n is less than or equal to the number m, in the block 27 $F_n$ is calculated as $L_n - D_n \cdot (m-n)$. If instead the comparison receives the result NO, in the block 29 the calculation of $F_n$ is performed by means of the expression $L_n - D_n \cdot (M+m-n)$.

These two cases are necessary, since the channel number m for the channel, for which the count value has been latest decremented, for instance cyclically runs through the values 0, 1, 2, ..., M−1. The expression inside the brackets in the blocks 27 and 29 will thereby indicate the number of channels, the count values of which remain to be decremented, before the count value of the channel having the number n belonging to the present cell is to be decremented.

Figure 4:
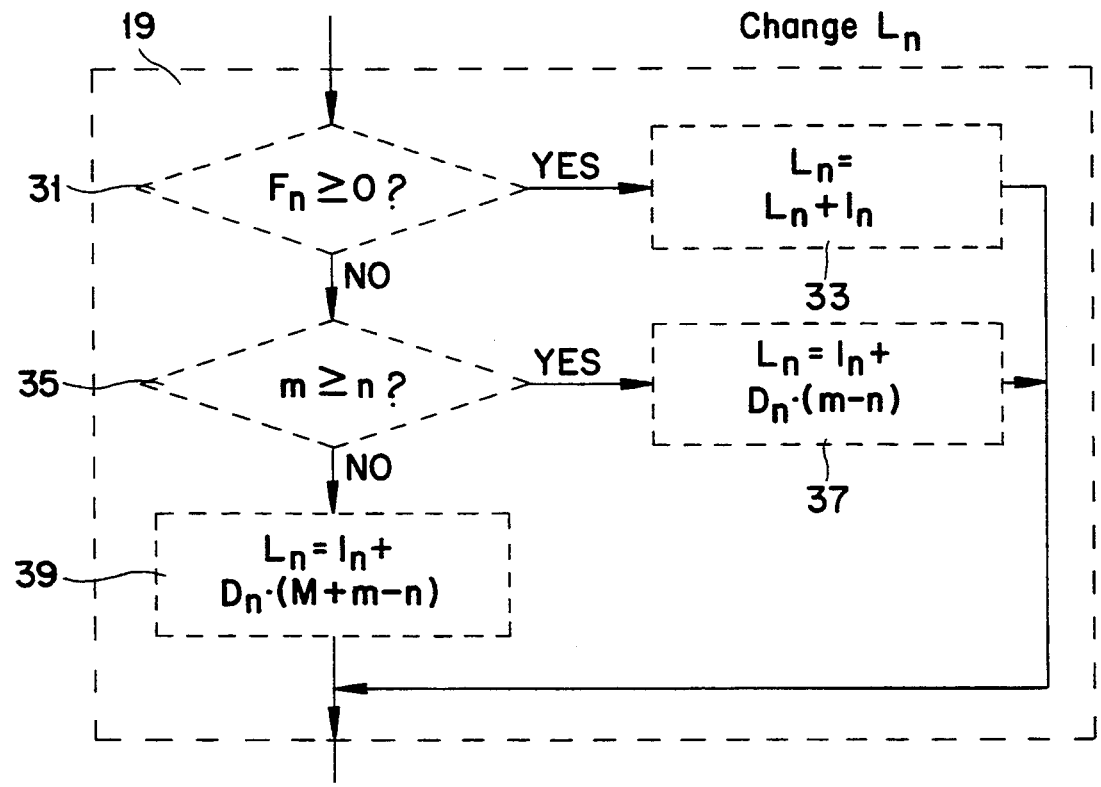

In FIG. 4 is illustrated in detail how the change of the count value $L_n$ in block 19 is performed. Here first in a block 31 it is determined whether the calculated value $F_n$ is larger than or equal to zero. If the answer from the comparison is YES, in the block 33 the count value $L_n$ is decremented with the step $I_n$, which is stored in the monitoring unit 11. If the answer from the comparison is NO, in a block 35 the channel number m for the channel, the count value $L_m$ of which has been latest decremented, is compared to the channel number n of the present cell. If the former channel number m is larger than the channel number of the present cell n, the block 37 is performed, where a new count value is provided by the expression $I_n + D_n \cdot (m-n)$, while in the opposite case the count value is given the value $I_n + D_n \cdot (M+m-n)$ in the block 39.

In the latter case, when the calculated value $F_n$ thus is smaller than zero, the new values of the count value $L_n$ are set in such a way, that a new value $F_n$ calculated by means of these values is given the value zero.

Below is given, formulated in pseudo code, the process which is performed each time, when a data packet arrives to the monitoring unit 11.

```
Process
begin
  repeat
    wait(Δt)
    if(cell arrived)
    begin
      if m >= n then
        F_n := L_n − D_n*(m − n);           : The real level value
      else                                   : for channel n is
        F_n := L_n − D_n*(M + m − n);       : interpolated.
      if F_n >= 0 then                       : If F_n < T_n the cell
        if T_n − F_n >= 0 then               : will be accepted
        begin                                : and the level value
          L_n := L_n + I_n;                  : is increased by the
          "Accept cell"                      : value I_n.
        end
        else
          "Discard cell"
      else                                   : If F_n < 0, some
      begin                                  : error is present,
        if m >= n then                       : since the real level
          L_n := I_n + D_n*(m − n);          : value cannot be
        else                                 : below zero. L_n is
          L_n := I_n + D_n*(M + m −          : given a value which
            n);                              : causes that F_n is
        "Accept cell"                        : given the value
```

```
        end
    end
    m := (m + 1)MOD M;              : The variable m takes
    L_m := L_m − M*D_m;             : care of the channel
    if L_m < 0 then                 : which is to be
        L_m := 0;                   : decremented. m is
    forever                         : incremented in the
end                                 : channel number
                                    : order.
```

EXAMPLE

Figure 5:
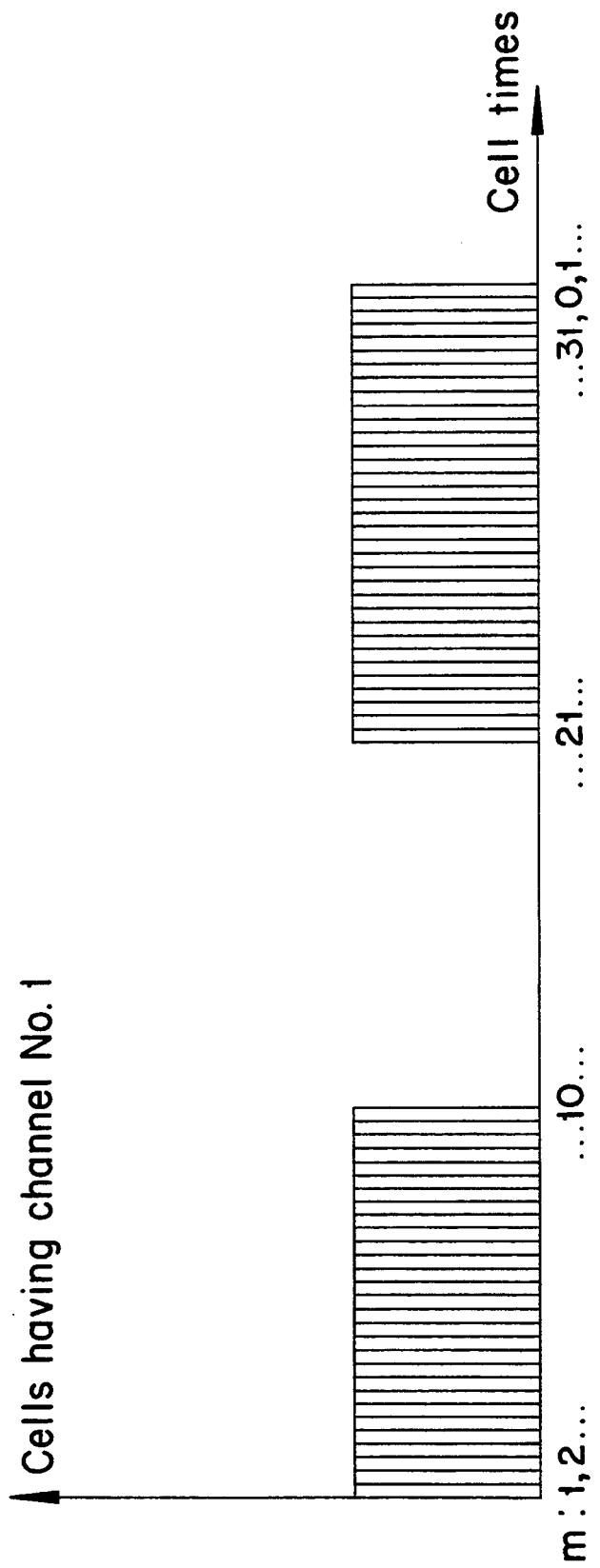
FIGS. 5–7 show an example made for a certain channel in the method according to the invention, where the latter two Figures show the variation of the count value and the variation of the calculated value respectively.
Figure 6:
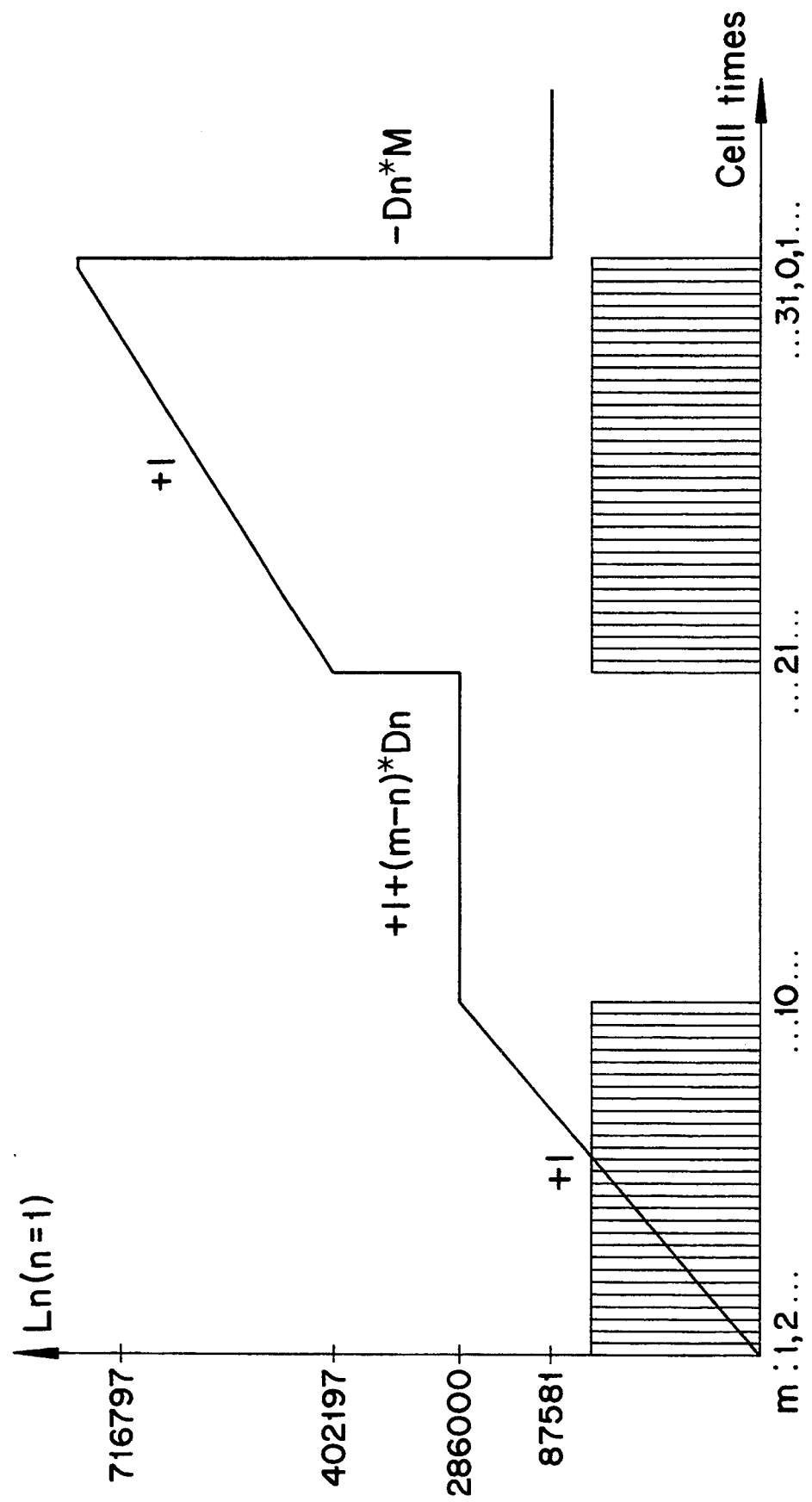
Figure 7:
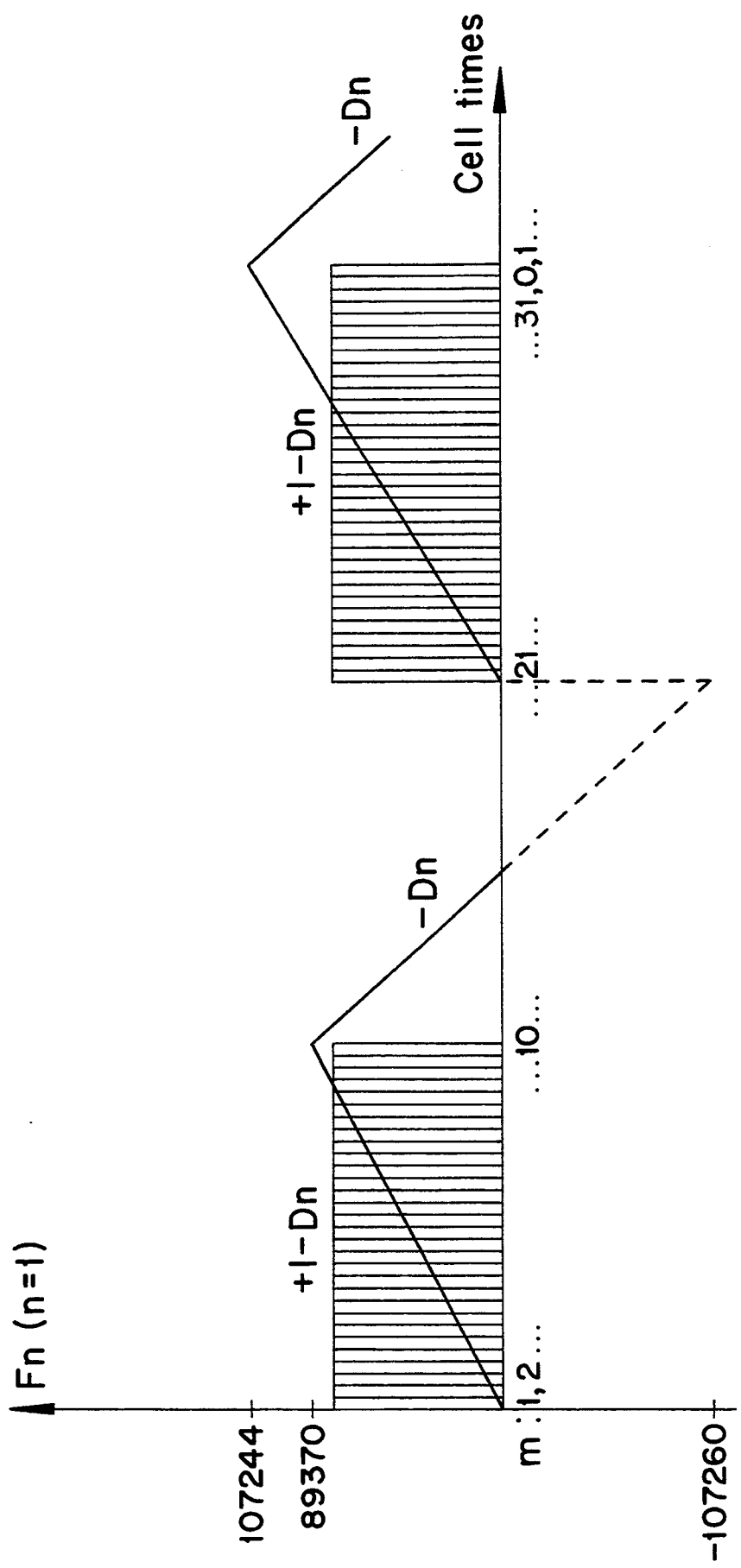

The difference between the count value $L_n$ and the calculated level value $F_n$ for a channel will be elucidated with an example illustrated in FIGS. 5–7. We will consider that 10 cells arrive sequentially all having the same channel number, say channel number 1, followed by 10 cells having some other channel number and thereafter further 12 cells all having the channel number 1, as appears from FIG. 5.

FIGS. 6 and 7 show how the count value $L_1$, which also can be termed the fictive level value, and the calculated or "real" level value $F_n$ respectively will vary, if the input signal on the line 5 is such as shown in FIG. 5. The numbers in the drawings are calculated for the following values of the variables belonging to channel 1:

M: The number of channels, which can be monitored by the device, is set to 32. In real cases the number of channels, which can be monitored by the device, will be significantly larger.

$D_1$: The channel dependent decrement value $D_1$ for channel 1 is set to 19663.

$I_1$: The increment value $I_1$ is set to 28600.

$T_1$: The threshold value is set to a very high value.

The following process will then be obtained and is first illustrated in FIG. 6, showing the variation of the count value $L_1$, when cells arrive. The states are numbered with the channel number m for the count value $L_n$ which has been latest decreased:

m=1, 2, ... 10: Since the threshold value $T_1$ is very large, all of the 10 first cells will be accepted. The level count $L_1$ is increased by the value $I_1$ for each cell, which has the channel number 1 and which is accepted. After the first 10 cells have arrived, $L_1$ has thus obtained the value $10 \cdot I_1$ (=286000).

m=11, 12, ..., 20: The following 10 cells have not channel number 1 and thus $L_1$ is not influenced.

m=21, 22, ..., 31, 0: When the first cell having channel number 1 arrives (m=21), it is discovered that the real level value $F_1$ is smaller than zero (see FIG. 7). In order to correct it in such a way, that this value $F_1$ actually will indicate a value, which corresponds to the level value in the known algorithm, $L_1$ is given a value $(I_1 + (m-n) \cdot D_1)$, which makes the real level value $F_1$ equal to zero. After that $L_1$ is increased by $I_1$ for each cell, which arrives and has channel number 1. When the variable m again takes the value 1, channel 1 is decremented by the value $M \cdot D_1$.

m=1: When m=1, the count value $L_1$ of channel 1 is to be decremented by $M \cdot D_1$.

In FIG. 7 is shown the variation of the real or the calculated level value $F_1$ plotted against the number of arrived cells. The process is as follows:

m=1, 2, ..., 10: The first 10 cells are accepted by the process. For each accepted cell a value $I_1$ is added to $L_1$. At the same time the variable m is increased by one, which results in $F_1$ being decreased by $D_1$ for each arriving cell.

m=11, 12, ..., 20: These cells have not channel number 1 and thus $L_1$ is not influenced. Instead $F_1$ is continuously decreased by the leakage value $D_1$.

m=21, 22, ..., 31, 0: When the first cell having channel number 1 arrives, the real value $F_1$ is calculated. Then it is discovered, that $F_1$ has a value smaller than zero (=−107260). By giving $L_1$ the value $I_1 + (m-n) \cdot D_1$ $F_1$ is given the value zero.

m=1: When m=1 $L_1$ is decremented by $M \cdot D_1$. This gives $F_1 = L_1$.

What is claimed is:

1. In a packet data communication system comprising a transmission line on which data packets are transmitted on a plurality of channels, wherein each channel respectively has a predetermined maximal packet transmission frequency, a first value, and a second value, a method of controlling transmission such that data packets are not transmitted with a frequency exceeding a channel's predetermined maximal packet transmission frequency comprising the steps of:

changing the first value of a next one of the channels by a first step, wherein the first values are changed at each of successive first time intervals and in a cyclic order;

for each data packet arriving on the transmission line, determining a channel number of an arriving channel carrying the arriving data packet;

determining, for each arriving channel, a third value based on the arriving channel's first value and on the value of one of:
  (a) a total number of data packets that have arrived on the transmission line since the first value of the arriving channel was last changed, and
  (b) when successive data packets arrive during successive second time intervals, a total number of second time intervals elapsed since the first value of the arriving channel was last changed, wherein the third values of different arriving channels are based on the same one of (a) and (b);

respectively comparing each third value to each arriving channel's second value and, based on the comparison, performing one of the steps of:
  permitting transmission of the respective arriving data packet,
  discarding the respective arriving data packet, and
  marking the respective arriving data packet.

2. The method of claim 1, wherein the first time intervals are such that the first values are changed upon the arrivals of the data packets.

3. The method of claim 1, wherein the first time intervals and the second time intervals are equal.

4. The method of claim 1, wherein the third value of an arriving channel is a change of the first value of the arriving channel having a sign that is different from a sign of the first step.

5. The method of claim 1, wherein each channel has a respective first step.

6. The method of claim 1, wherein only one first value is changed at each first time interval and the first step is based on a product of the total number of channels and a fourth value.

7. The method of claim 6, wherein each channel has a respective fourth value.

8. The method of claim 1, wherein, when a changed first value has a sign that is different from its sign before being changed, the changed first value is changed to zero.

9. The method of claim 1, wherein the determination of the third value is also based on a fourth value.

10. The method of claim 9, wherein each channel has a respective fourth value.

11. The method of claim 1, wherein the third value is one of a sum of and a difference of the first value of the arriving channel and a value derived from a predetermined function of one of (a) the total number of data packets that have arrived on the transmission line since the first value of the arriving channel was last changed and, (b) when successive data packets arrive during successive second time intervals, the total number of second time intervals elapsed since the first value of the arriving channel was last changed; and the value derived from the predetermined function for different arriving channels is based on the same one of (a) and (b).

12. The method of claim 11, wherein the value derived from the predetermined function is a product of a fourth value and one of (a) the total number of data packets that have arrived on the transmission line since the first value of the arriving channel was last changed and, (b) when successive data packets arrive during successive second time intervals, the total number of second time intervals elapsed since the first value of the arriving channel was last changed; and the value derived from the predetermined function for different arriving channels is based on the same one of (a) and (b).

13. The method of claim 12, wherein each channel has a respective fourth value.

14. The method of claim 1, wherein the first value of an arriving channel is changed by a second step when transmission of the respective arriving data packet is permitted.

15. The method of claim 14, wherein each channel has a respective second step.

16. The method of claim 14, wherein the first step and the second step have different signs.

17. The method of claim 1, wherein, when a third value has a sign that is different from a sign of the respective arriving channel's first value, that first value is changed such that a third value determined based on the changed first value is zero.

18. The method of claim 1, wherein, when the channels are organized in groups, the first values of the channels in a next one of the groups are changed by the first step at each of successive first time intervals, the groups being changed in a cyclic order.

19. A device for controlling transmission of data packets on a transmission line having a plurality of channels such that data packets are not transmitted with a frequency greater than each channel's respective maximal packet transmission frequency, wherein each channel has a respective channel number, comprising:
   means for storing a first value and a second value for each channel;
   means for changing the first value of a channel by a first step, the first values of successive next ones of the channels being changed during successive first time intervals and in a cyclic order;
   means for determining, for each data packet arriving on the transmission line, a channel number of an arriving channel carrying the arriving data packet and for determining, for each arriving channel, a third value based on the respective arriving channel's first value and on the value of one of:
      (a) a total number of data packets that have arrived on the transmission line since the first value of the arriving channel was last changed, and
      (b) when successive data packets arrive during successive second time intervals, a total number of second time intervals elapsed since the first value of the arriving channel was last changed,
   wherein the third values of different arriving channels are based on the same one of (a) and (b);
   a comparator for comparing a third value to the respective arriving channel's second value; and
   means, based on the comparison, for performing one of the functions of permitting transmission of the respective arriving data packet discarding the respective arriving data packet, and marking the respective arriving data packet.

20. The device of claim 19, wherein the first values are changed upon the arrivals of the data packets.

21. The device of claim 19, wherein the first time intervals and the second time intervals are equal.

22. The device of claim 19, wherein the third value of an arriving channel is is a change of the first value of the arriving channel having a sign that is different from a sign of the first step.

23. The device of claim 19, wherein the storing means also stores a respective first step for each channel.

24. The device of claim 19, wherein the storing means stores a fourth value for each channel and the changing means changes only one first value at each first time interval and the first step is based on a product of the total number of channels and the fourth value.

25. The device of claim 19, wherein when a changed first value has a sign that is different from its sign before being changed, the changing means changes the changed first value to zero.

26. The device of claim 19, wherein the storing means also stores a fourth value for each channel and the determining means determines the third value also on the basis of the fourth value.

27. The device of claim 19, wherein the determining means determines one of a sum of and a difference of a first value of the arriving channel and a value derived from a predetermined function of one of (a) the total number of data packets that have arrived on the transmission line since the first value of the arriving channel was last changed and, (b) when successive data packets arrive during successive second time intervals, the total number of second time intervals elapsed since the first value of the arriving channel was last changed; and the value derived from the predetermined function for different arriving channels is based on the same one of (a) and (b).

28. The device of claim 27, wherein the storing means also stores respective fourth values for the channels and the value derived from the predetermined function is a product of the respective fourth value and one of (a) the total number of data packets that have arrived on the transmission line since the respective first value of the arriving channel was last changed and, (b) when successive data packets arrive during successive second time intervals, the total number of second time intervals elapsed since the respective first value of the arriving channel was last changed; and the value derived from the predetermined function for different arriving channels is based on the same one of (a) and (b).

29. The device of claim 19, wherein the first value of an arriving channel is changed by a second step when transmission of the respective arriving data packet is permitted.

30. The device of claim 29, wherein the first step and the second step have different signs.

31. The device of claim 19, wherein the changing means, when a third value has a sign that is different from a sign of the respective arriving channel's first value, changes that first value such that a third value determined based on the changed first value is zero.

32. The device of claim 19, wherein, when the channels are organized in groups, the changing means changes the first values of the channels in successive next ones of the groups during successive first time intervals, the groups being changed in a cyclic order.

33. A method of controlling data packet transmission on a transmission line comprising the steps of:
  providing a plurality of channels, each channel having a maximal packet transmission frequency, a channel number, a count value, and a threshold value;
  changing the count value of each of the channels in succession, one count value being changed during each successive first time interval;
  determining, for each data packet arriving on the transmission line, the channel number of an arriving channel which is carrying the arriving data packet;
  generating, for each arriving channel, a frequency value based on the arriving channel's count value and channel number and on the channel number corresponding to the count value most recently changed in the changing step; and
  comparing, for each arriving channel, the frequency value with the respective arriving channel's threshold value and, based on the comparison, performing one of the steps of:
    permitting transmission of the respective arriving data packet;
    discarding the respective arriving data packet; and
    marking the respective arriving data packet.

* * * * *